United States Patent
Jeong

(10) Patent No.: US 9,873,377 B2
(45) Date of Patent: Jan. 23, 2018

(54) METHOD AND APPARATUS FOR DIAGNOSIS OF BRAKE LIGHT

(71) Applicant: Hyundai Mobis Co., Ltd., Seoul (KR)

(72) Inventor: Hee Jeong, Yongin-si (KR)

(73) Assignee: Hyundai Mobis Co., Ltd., Seoul (KR)

( * ) Notice: Subject to any disclaimer, the term of this patent is extended or adjusted under 35 U.S.C. 154(b) by 0 days.

(21) Appl. No.: 15/251,837

(22) Filed: Aug. 30, 2016

(65) Prior Publication Data
US 2017/0144598 A1  May 25, 2017

(30) Foreign Application Priority Data
Nov. 23, 2015 (KR) .......................... 10-2015-0163797

(51) Int. Cl.
*B60Q 11/00* (2006.01)
*B60Q 1/44* (2006.01)

(52) U.S. Cl.
CPC .............. *B60Q 11/005* (2013.01); *B60Q 1/44* (2013.01)

(58) Field of Classification Search
None
See application file for complete search history.

(56) References Cited

U.S. PATENT DOCUMENTS

| 4,088,980 A * | 5/1978 | Tanigawa | F16D 66/022 340/316 |
|---|---|---|---|
| 2002/0125764 A1* | 9/2002 | Sakamoto | B60T 8/3225 303/9.63 |
| 2004/0263178 A1* | 12/2004 | Klaus | B60T 13/683 324/504 |
| 2008/0238646 A1* | 10/2008 | Hatano | B60Q 1/44 340/451 |

FOREIGN PATENT DOCUMENTS

JP 2016203883 A * 12/2016

* cited by examiner

*Primary Examiner* — Julie Lieu
(74) *Attorney, Agent, or Firm* — H.C. Park & Associates, PLC

(57) ABSTRACT

An apparatus for diagnosing a brake light malfunction includes a primary abnormality signal output unit to output a primary brake light abnormality signal using primary state information of a vehicle, a secondary brake light abnormality signal output unit to output a secondary abnormality signal using secondary state information of the vehicle. An abnormality signal verifier outputs a third brake light abnormality signal when receiving the primary and secondary abnormality signals, and outputs a fourth brake light abnormality signal using the third abnormality signal and an abnormality signal of an engine control system of the vehicle. A final abnormality determiner changes into a malfunction state mode from a normal state mode when receiving the fourth abnormality signal, and determines whether the brake light is in a final abnormal state, depending on whether an operation time of the malfunction state mode exceeds a predetermined longest malfunction-sensing time.

15 Claims, 5 Drawing Sheets

METHOD AND APPARATUS FOR DIAGNOSIS OF BRAKE LIGHT

CROSS-REFERENCE TO RELATED APPLICATIONS

This application claims priority from and the benefit of Korean Patent Application No. 10-2015-0163797, filed on Nov. 23, 2015, which is hereby incorporated by reference for all purposes as if fully set forth herein.

BACKGROUND

Field

The present disclosure relates to an apparatus and a method for diagnosing a brake light.

Discussion of the Background

A brake light is an important part that shows the drivers in vehicles behind that the driver in a vehicle moving ahead intends to brake while driving. Brake lights have no self-diagnosis function, so malfunctions of brake lights are diagnosed using values converted from switch signals from brake lights.

However, diagnosing malfunctions of brake lights using only switch signals from the brake lights is low in reliability, and there is no signal that can be used instead when brake lights break down, so errors, such as misjudgment of a driver's intention to brake by an ESC (Electronic Stability Control) system, may occur. Accordingly, a function of checking effectiveness and sensing a malfunction in order to increase the reliability of the switch signals of brake lights is needed.

The above information disclosed in this Background section is only for enhancement of understanding of the background of the inventive concept, and, therefore, it may contain information that does not form the prior art that is already known in this country to a person of ordinary skill in the art.

SUMMARY

The present disclosure has been made in an effort to provide an apparatus and a method for diagnosing a brake light that can improve reliability when determining a malfunction of a brake light.

Additional aspects will be set forth in the detailed description which follows, and, in part, will be apparent from the disclosure, or may be learned by practice of the inventive concept.

An exemplary embodiment discloses an apparatus for diagnosing a brake light. The apparatus includes a primary abnormality signal output unit configured to output a primary abnormality signal of the brake light using primary state information of a vehicle, a secondary abnormality signal output unit configured to outputs a secondary abnormality signal of the brake light using secondary state information of the vehicle, an abnormality signal verifier configured to output a third abnormality signal of the brake light when receiving the primary abnormality signal and the secondary abnormality signal, and output a fourth abnormality signal of the brake light using the third abnormality signal and an abnormality signal of an engine control system of the vehicle, and a final abnormality determiner configured to change into a malfunction state mode from a normal state mode when receiving the fourth abnormality signal, and configured to determine whether the brake light is in a final abnormal state, depending on whether an operation time of the malfunction state mode exceeds a predetermined longest malfunction-sensing time.

The primary state information may include turning-on/off signals of the brake light, a speed of the vehicle, malfunction information of a brake pressure sensor of the vehicle, pressure of a wheel of the vehicle, and/or control information of the vehicle.

When the brake light has a malfunction, the speed of the vehicle is a reference speed or more, the brake pressure sensor has a malfunction, the pressure of the wheel of the vehicle is reference pressure or less, and/or a brake control system of the vehicle is not controlled, the primary abnormality signal output unit may determine that the brake light is in a primary abnormal state.

When the brake light is in the primary abnormal state, the primary abnormality signal output unit may determine whether to output the primary abnormality signal using a continuing time of the turning-on or the turning-off signal and a predetermined longest error-sensing time.

The secondary state information may include turning-on/off signals of the brake light, a speed of the vehicle calculated by the engine control system, malfunction information of a master cylinder of the vehicle, pressure of the master cylinder of the vehicle, and/or control information of the vehicle.

When the brake light has a malfunction, the speed of the vehicle is a reference speed or more, the master cylinder has a malfunction, the pressure of the master cylinder is reference pressure or less, and/or another control system of the vehicle is not controlled, the secondary abnormality signal output unit may determine that the vehicle is in a secondary abnormal state.

When the vehicle is in the secondary abnormal state, the secondary abnormality signal output unit may determine whether to output the secondary abnormality signal using a continuing time of the turning-on or the turning-off signal and a predetermined longest error-sensing time.

The final abnormality determiner may determine that the brake light is in a final abnormal state and keep an error code, when the operation time of the malfunction state mode exceeds the longest malfunction-sensing time.

Another exemplary embodiment discloses a method of diagnosing a brake light. The method includes: a primary abnormality signal output step in which a primary abnormality signal output unit outputs a primary abnormality signal of the brake light using primary state information of a vehicle; a secondary abnormality signal output step in which secondary abnormality signal output unit outputs a secondary abnormality signal of the brake light using secondary state information of the vehicle; a third abnormality signal output step in which an abnormality signal verifier outputs a third abnormality signal of the brake light when receiving the primary abnormality signal and the secondary abnormality signal; a fourth abnormality signal output step in which the abnormality signal verifier outputs a fourth abnormality signal of the brake light using the third abnormality signal and an abnormality signal of an engine control system of the vehicle; and a final abnormality determining step in which a final abnormality determiner is changed into a malfunction state mode from a normal state mode when receiving the fourth abnormality signal and determines whether the brake light is in a final abnormal state, depending on whether an operation time of the malfunction state mode exceeds a predetermined longest malfunction-sensing time.

The primary state information may include turning-on/off signals of the brake light, a speed of the vehicle, malfunction information of a brake pressure sensor of the vehicle, pressure of a wheel of the vehicle, and/or control information of the vehicle.

The primary abnormality signal output step may include a primary state determining step of determining that the brake light is in a primary state, depending on whether the brake light has a malfunction, the speed of the vehicle is a reference speed or more, the brake pressure sensor has a malfunction, the pressure of the wheel of the vehicle is reference pressure or less, and/or a brake control system of the vehicle is not controlled.

When the brake light is in the primary abnormal state, the primary abnormality signal output step may determine whether to output the primary abnormality signal using a continuing time of the turning-on or the turning-off signal and a predetermined longest error-sensing time.

The secondary state information may include turning-on/off signals of the brake light, a speed of the vehicle calculated by the engine control system, malfunction information of a master cylinder of the vehicle, pressure of the master cylinder of the vehicle, and/or control information of the vehicle.

The secondary abnormality signal output step may include a secondary state determining step of determining that the brake light is in a secondary state, depending on whether the brake light has a malfunction, a speed of the vehicle calculated by the engine control system is a reference speed or more, the master cylinder has a malfunction, the pressure of the master cylinder is reference pressure or less, and/or a brake control system of the vehicle is not controlled.

When the brake light is in the secondary abnormal state, the secondary abnormality signal output step may determine whether to output the secondary abnormality signal using a continuing time of the turning-on or the turning-off signal and a predetermined longest error-sensing time.

The foregoing general description and the following detailed description are exemplary and explanatory and are intended to provide further explanation of the claimed subject matter.

BRIEF DESCRIPTION OF THE DRAWINGS

The accompanying drawings, which are included to provide a further understanding of the inventive concept, and are incorporated in and constitute a part of this specification, illustrate exemplary embodiments of the inventive concept, and, together with the description, serve to explain principles of the inventive concept.

Figure 1:
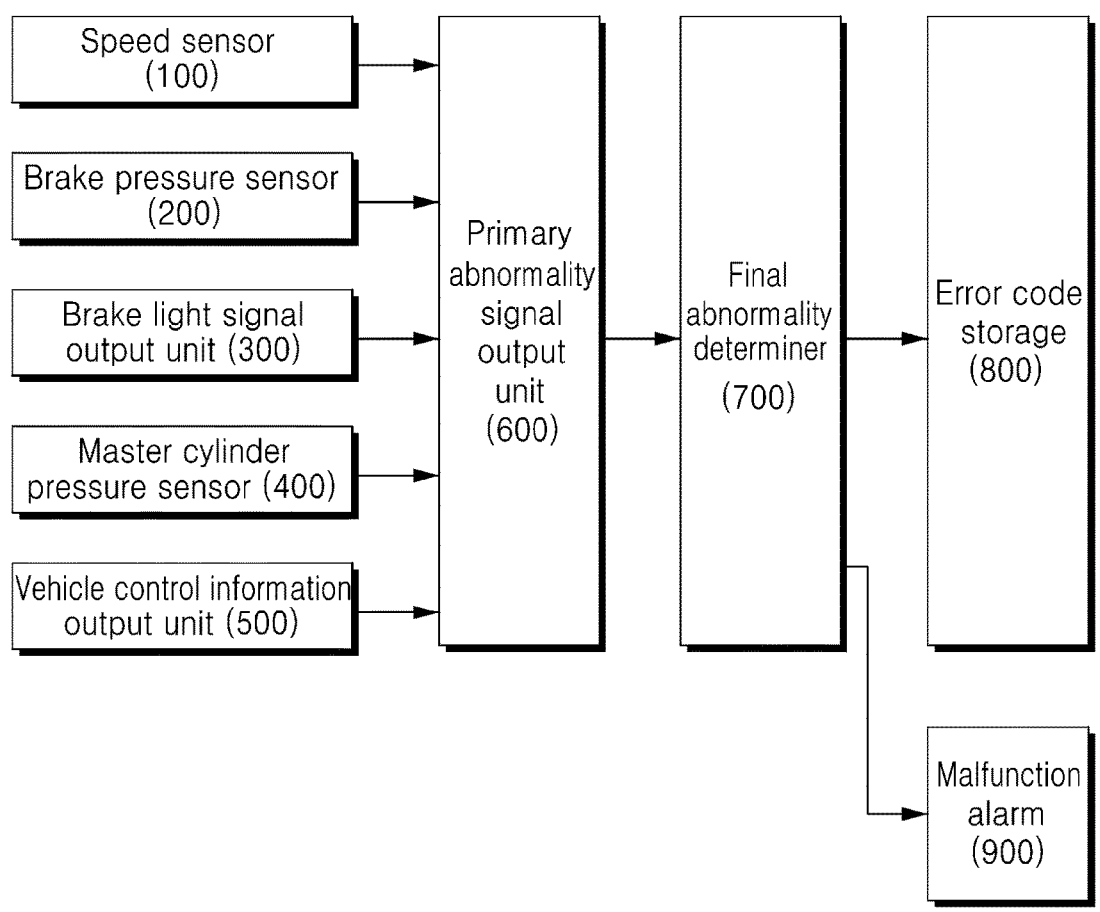
FIG. 1 is a diagram illustrating the configuration of an apparatus for diagnosing a brake light according to a first exemplary embodiment.

It should be understood that the appended drawings are not necessarily to scale, presenting a somewhat simplified representation of various features illustrative of the basic principles of the disclosure. The specific design features of the present disclosure as disclosed herein, including, for example, specific dimensions, orientations, locations, and shapes will be determined in part by the particular intended application and use environment.

In the figures, reference numbers refer to the same or equivalent parts of the present disclosure throughout the several figures of the drawings.

DETAILED DESCRIPTION OF THE ILLUSTRATED EMBODIMENTS

In the following description, for the purposes of explanation, numerous specific details are set forth in order to provide a thorough understanding of various exemplary embodiments. It is apparent, however, that various exemplary embodiments may be practiced without these specific details or with one or more equivalent arrangements. In other instances, well-known structures and devices are shown in block diagram form in order to avoid unnecessarily obscuring various exemplary embodiments.

When an element is referred to as being "on," "connected to," or "coupled to" another element, it may be directly on, connected to, or coupled to the other element or intervening elements may be present. When, however, an element is referred to as being "directly on," "directly connected to," or "directly coupled to" another element, there are no intervening elements present. For the purposes of this disclosure, "at least one of X, Y, and Z" and "at least one selected from the group consisting of X, Y, and Z" may be construed as X only, Y only, Z only, or any combination of two or more of X, Y, and Z, such as, for instance, XYZ, XYY, YZ, and ZZ. Like numbers refer to like elements throughout. As used herein, the term "and/or" includes any and all combinations of one or more of the associated listed items.

Although the terms first, second, etc. may be used herein to describe various elements, components, regions, and/or sections, these elements, components, regions, and/or sections should not be limited by these terms. These terms are used to distinguish one element, component, region, and/or section from another element, component, region, and/or section. Thus, a first element, component, region, and/or section discussed below could be termed a second element, component, region, and/or section without departing from the teachings of the present disclosure.

Spatially relative terms, such as "beneath," "below," "lower," "above," "upper," and the like, may be used herein for descriptive purposes, and, thereby, to describe one element or feature's relationship to another element(s) or feature(s) as illustrated in the drawings. Spatially relative terms are intended to encompass different orientations of an apparatus in use, operation, and/or manufacture in addition to the orientation depicted in the drawings. For example, if the apparatus in the drawings is turned over, elements described as "below" or "beneath" other elements or features would then be oriented "above" the other elements or features. Thus, the exemplary term "below" can encompass both an orientation of above and below. Furthermore, the apparatus may be otherwise oriented (e.g., rotated 90 degrees or at other orientations), and, as such, the spatially relative descriptors used herein interpreted accordingly.

The terminology used herein is for the purpose of describing particular embodiments and is not intended to be limiting. As used herein, the singular forms, "a," "an," and "the" are intended to include the plural forms as well, unless the context clearly indicates otherwise. Moreover, the terms "comprises," "comprising," "includes," and/or "including," when used in this specification, specify the presence of stated features, integers, steps, operations, elements, components, and/or groups thereof, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this disclosure is a part. Terms, such as those defined in commonly used dictionaries, should be interpreted as having a meaning that is consistent with their meaning in the context of the relevant art and will not be interpreted in an idealized or overly formal sense, unless expressly so defined herein.

FIG. 1 is a diagram illustrating the configuration of an apparatus for diagnosing a brake light according to an exemplary embodiment. The apparatus for diagnosing a brake light according to the first exemplary embodiment may include a speed sensor 100, a brake pressure sensor 200, a brake light signal output unit 300, a master cylinder pressure sensor 400, a vehicle control information output unit 500, a primary abnormality signal output unit 600, a final abnormality determiner 700, an error code storage 800, and a malfunction alarm 900.

The speed sensor 100 measures the speed of a vehicle. The speed sensor 100 outputs the measured speed to the primary abnormality signal output unit 600. One of the reasons that the apparatus for diagnosing a brake light according to the first exemplary embodiment measures the speed of a vehicle is because a vehicle that is moving may slow down in an emergency in many cases. The apparatus for diagnosing a brake light according to the first exemplary embodiment may not be operated when a vehicle is stopped. The apparatus for diagnosing a brake light according to the first exemplary embodiment may diagnose a malfunction of a brake light while a vehicle is moving.

The brake pressure sensor 200 may measure and output the braking pressure that is generated when a brake pedal is pushed for braking a vehicle. This is for determining whether a vehicle is braking or not.

The brake light signal output unit 300 may output turning-on/off signals of a brake light to the primary abnormality signal output unit 600. The brake light signal output unit 300 may also output the length of time for which the brake light switch has been short-circuited and the brake pedal has been pressed.

The master cylinder pressure sensor 400 may measure the pressure of a master cylinder and output the pressure to the primary abnormality signal output unit 600.

The vehicle control information output unit 500 may output whether an ABS (Antilock Braking System), a TCS (traction control system), an ETCS (electronic traction control system), a BTCS (Brake Traction Control System), and/or DTC (Dynamic Traction Control) are normally operated to the primary abnormality signal output unit 600.

The primary abnormality signal output unit 600 may output a primary abnormality signal of a brake light by checking the state of the vehicle. The primary abnormality signal output unit 600 may check the state of a vehicle in consideration of the speed of the vehicle, the pressure of the master cylinder, and/or the control information of the vehicle. The primary abnormality signal output unit 600 may output a primary abnormality signal in consideration of a malfunction-continuing time and the number of malfunctions.

The primary abnormality signal output unit 600 may determine whether a primary malfunction-continuing time is less than the longest error-sensing time. In the method of diagnosing a brake light according to the first exemplary embodiment, the longest error-sensing time is set in advance and may be set to 120 seconds, but is not limited to a specific time. When the malfunction-continuing time is 120 seconds or more, the primary abnormality signal output unit 600 may repeatedly check the state of the vehicle.

When the malfunction-continuing time is less than 120 seconds, the primary abnormality signal output unit 600 may increase the number of times of malfunction of a brake light of the vehicle by 1 each time. The primary abnormality signal output unit 600 may determine whether the number of times of malfunction exceeds three. When the number of time of malfunction exceeds three, the primary abnormality signal output unit 600 may output a primary abnormality signal. When the number of times of malfunction is 3 or less, the primary abnormality signal output unit 600 may allow a HBA (Hydraulic Brake Assist) system to be manually operated. Despite the disclosure of 3 as an example, the number of times of malfunction set in the primary abnormality signal output unit 600 is not limited to a specific number of times, and may be varied without departing from the scope of the inventive concept.

The final abnormality determiner 700 may compare the primary abnormality signal with predetermined malfunction information. The final abnormality determiner 700 may determine whether a brake light has a malfunction by comparing the primary abnormality signal with the predetermined malfunction information. The final abnormality determiner 700 may output a malfunction signal for the brake light to the malfunction alarm 900 when determining that the brake light has a malfunction. The predetermined malfunction information considered by the final abnormality determiner 700 according to the first exemplary embodiment may be provided by another vehicle device in the vehicle, for example, an EMS (Engine Management System).

The primary abnormality signal output unit 600 may initialize the counted number of times of malfunction to 0 or a different predetermined number of times.

The malfunction alarm 900 may warn a driver of a malfunction of a brake light using at least one of a sound, an image, and a vibration (S170). The malfunction alarm 900 may keep an error code set in advance for a malfunction of a brake light.

The operation of the method of diagnosing a brake light according to the present disclosure is described as follows.

Figure 2:
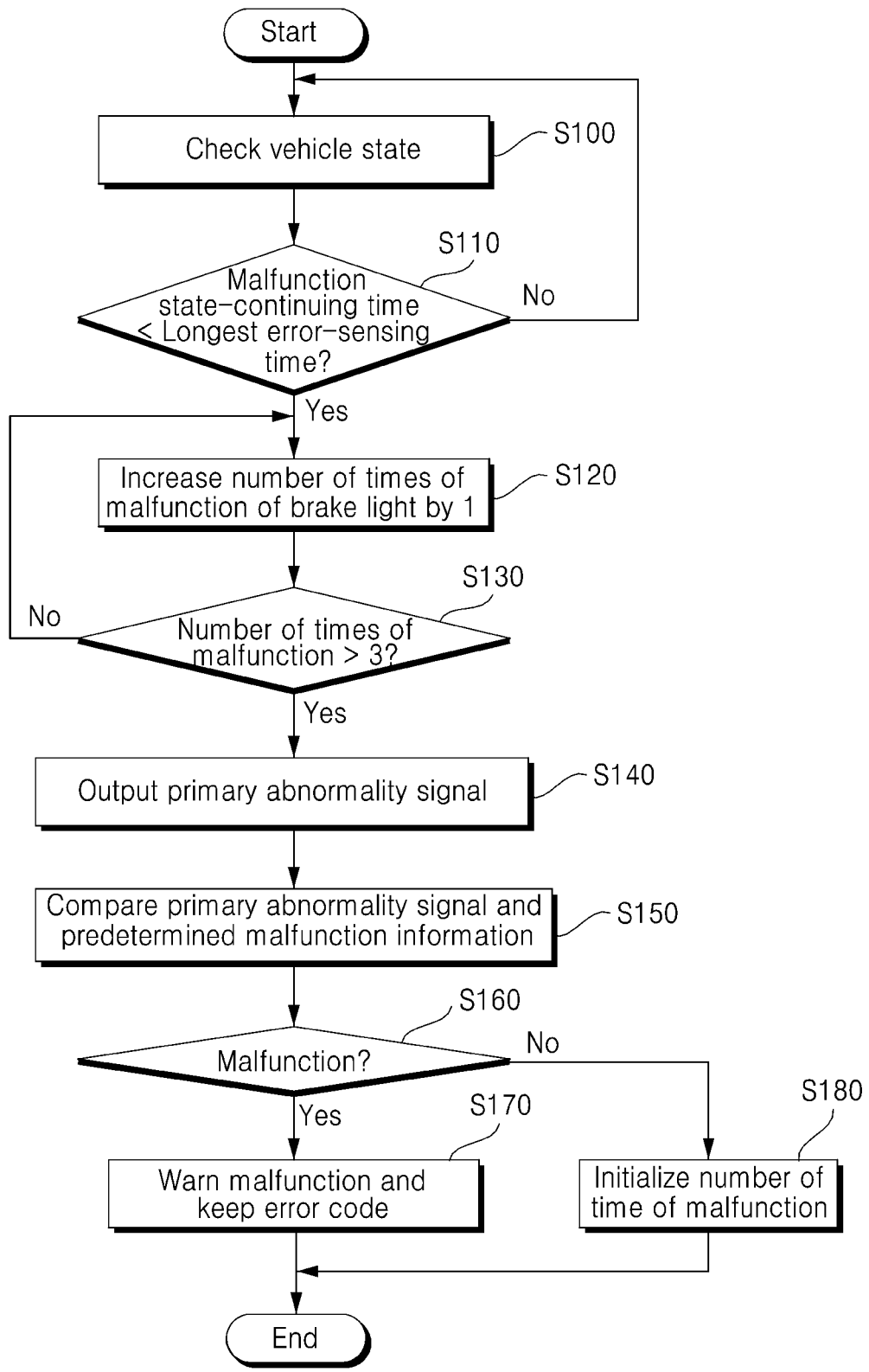
FIG. 2 is a flowchart illustrating a control flow of a method of diagnosing a brake light by the configuration illustrated in FIG. 1.

FIG. 2 is a flowchart illustrating a control flow of a method of diagnosing a brake light by the configuration illustrated in FIG. 1.

The primary abnormality signal output unit 600 may check the state of a vehicle (S100). The primary abnormality signal output unit 600 may receive the speed of the vehicle outputted by the speed sensor 100. The primary abnormality signal output unit 600 may receive the pressure signal due to the pressing of the brake pedal outputted by the brake pressure sensor 200. The primary abnormality signal output unit 600 may receive signals outputted from the brake light signal output unit 300. The primary abnormality signal output unit 600 may receive turning-on/off signals of a brake light. The primary abnormality signal output unit 600 may receive the time for which the brake light switch has been pushed and outputted from the master cylinder pressure sensor 400. The vehicle control information output unit 500 may receive whether an ABS (Antilock Braking System), a TCS (traction control system), an ETCS (electronic traction control system), a BTCS (Brake Traction Control System), and/or DTC (Dynamic Traction Control) are normally operated or not.

The primary abnormality signal output unit 600 may check the state of the vehicle for at least one of whether the brake light has a malfunction, the speed of the vehicle, whether the pressure sensor has a malfunction, the pressure of the master cylinder, and whether the ABS (Antilock Braking System), the TCS (traction control system), the ETCS (electronic traction control system), the BTCS (Brake Traction Control System), and the DTC (Dynamic Traction Control) are normally operated.

The primary abnormality signal output unit 600 may determine whether the brake light has a malfunction, the speed of the vehicle is 20 kph (kilometer per hour) or more, the brake pressure sensor 200 has a malfunction, the pressure of the master cylinder is 7 bar or less, and at least one of the ABS (Antilock Braking System), the TCS (traction control system), the ETCS (electronic traction control system), the BTCS (Brake Traction Control System), and the DTC (Dynamic Traction Control) has a malfunction (S100).

The primary abnormality signal output unit 600 may determine the brake light has broken down when all of the conditions, that the brake light has a malfunction, the speed of the vehicle is 20 kph (kilometer per hour) or more, the brake pressure sensor 200 has a malfunction, the pressure of the master cylinder is 7 bar or less, and at least one of the ABS (Antilock Braking System), the TCS (traction control system), the ETCS (electronic traction control system), the BTCS (Brake Traction Control System), and the DTC (Dynamic Traction Control) has a malfunction, are satisfied (S100).

The primary abnormality signal output unit 600 may initialize the number of times of malfunction of the brake light to 0, when at least one of the conditions that the brake light has a malfunction, the speed of the vehicle is 20 kph (kilometer per hour) or more, the brake pressure sensor 200 has a malfunction, the pressure of the master cylinder is 7 bar or less, and at least any one of the ABS (Antilock Braking System), the TCS (traction control system), the ETCS (electronic traction control system), the BTCS (Brake Traction Control System), and the DTC (Dynamic Traction Control) has a malfunction, is not satisfied.

The primary abnormality signal output unit 600 may determine whether the time of a primary malfunction-continuing time is less than the longest malfunction-sensing time (S110). In the method of diagnosing a brake light according to the first exemplary embodiment, the longest error-sensing time is set in advance and may be set to 120 seconds, but is not limited thereto.

When the malfunction-continuing time is 120 seconds or more, the primary abnormality signal output unit 600 may repeatedly check the state of a vehicle.

When the malfunction-continuing time is less than 120 seconds, the primary abnormality signal output unit 600 may increase the number of times of malfunction of a brake light of a vehicle by 1 for each malfunction (S120).

The primary abnormality signal output unit 600 may determine whether the number of times of malfunction exceeds three (S130).

When the number of time of malfunction exceeds three, the primary abnormality signal output unit 600 may output a primary abnormality signal (S140). When the number of times of malfunction is 3 or less, the primary abnormality signal output unit 600 may allow a HBA (Hydraulic Brake Assist) to be manually operated. However, the number of times of malfunction set in the primary abnormality signal output unit 600 is not limited thereto.

The final abnormality determiner 700 may compare the primary abnormality signal with predetermined malfunction information (S150).

The final abnormality determiner 700 may determine whether a brake light has a malfunction by comparing the primary abnormality signal with the predetermined malfunction information (S160). The final abnormality determiner 700 may output a malfunction signal for the brake light to the malfunction alarm 900, when finally determining that the brake light has a malfunction (S160).

The malfunction alarm 900 may warn a driver of a malfunction of a brake light using at least one of a sound, an image, and a vibration (S170). The malfunction alarm 900 may keep an error code set in advance for a malfunction of a brake light.

The primary abnormality signal output unit 600 may initializes the counted number of times of malfunction to 0 or a predetermined number of times (S180).

Figure 3:
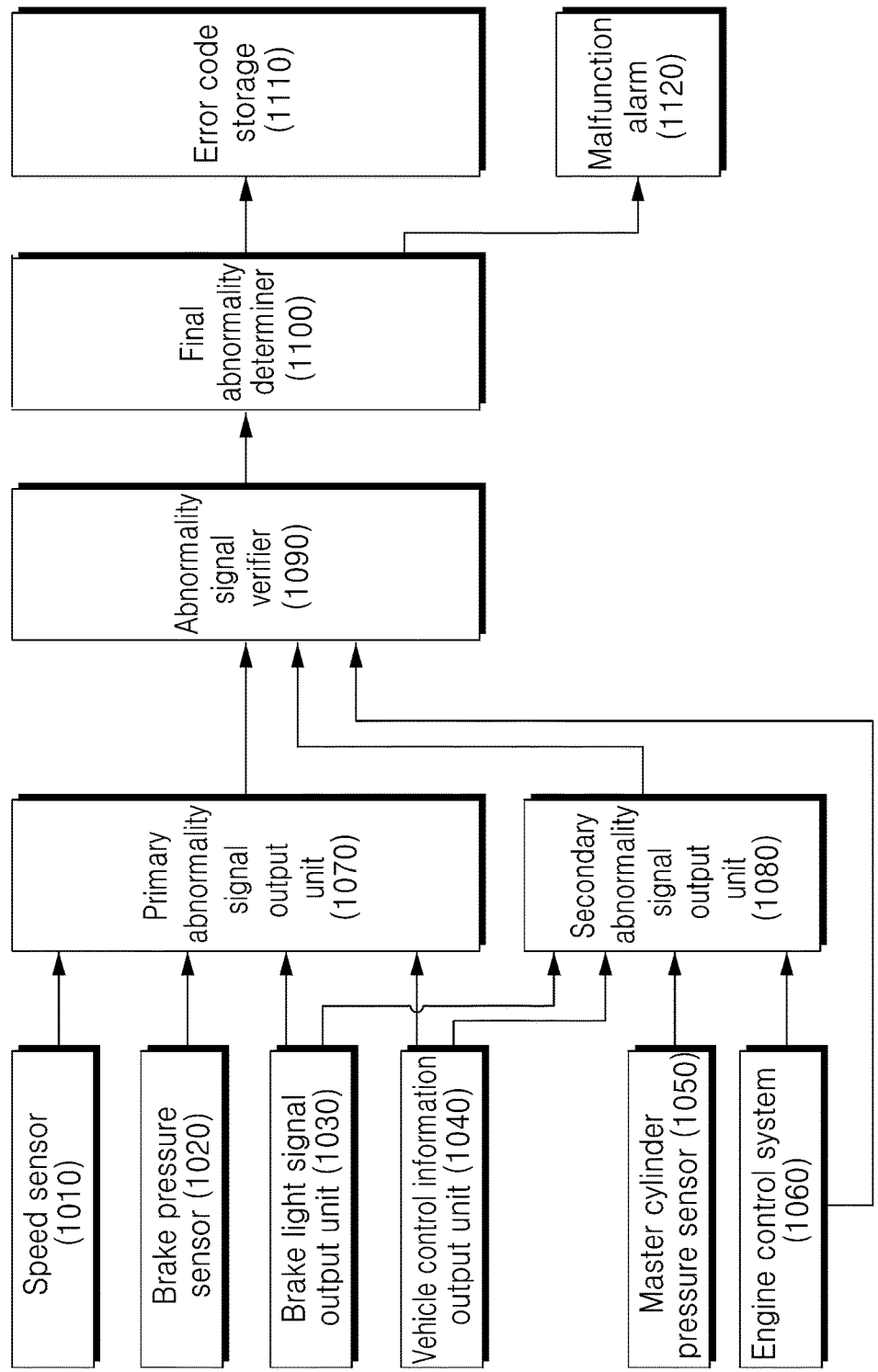
FIG. 3 is a diagram illustrating the configuration of an apparatus for diagnosing a brake light according to a second exemplary embodiment.

Referring to FIG. 3, an apparatus for diagnosing a brake light according to a second exemplary embodiment may include a speed sensor 1010, a brake pressure sensor 1020, a brake light signal output unit 1030, a vehicle control information output unit 1040, a master cylinder pressure sensor 1050, an engine control system 1060, a primary abnormality signal output unit 1070, a secondary abnormality signal output unit 1080, an abnormality signal verifier 1090, a final abnormality determiner 1100, an error code storage 1110, and a malfunction alarm 1120.

The speed sensor 1010 may measure the speed of a vehicle. The speed sensor 1010 may output the measured speed of the vehicle to the primary abnormality signal output unit 1070. Herein, since drivers may brake in an emergency while driving a vehicle, brake lights are diagnosed while a vehicle is moving and the speed of the vehicle is measured to check whether the vehicle is moving.

When a brake pedal is operated and a vehicle is braked by a driver, the brake pressure sensor 1020 may measure the pressure applied to a wheel of the vehicle and output the pressure to the primary abnormality signal output unit 1070. Herein, a pressure value may be calculated when a driver operates the brake pedal to brake the vehicle, which is used not only for generating brake pressure, but also for determining whether a primary malfunction has occurred in a brake light by being transmitted to the primary abnormality signal output unit 1070.

Further, malfunction information of the brake pressure sensor 1020 may be generated on the basis of the pressure value based on operation of the brake pedal and the pressure measured by the brake pressure sensor 1020 and may be outputted to the primary abnormality signal output unit 1070 to be used for determining whether a primary malfunction has occurred in a brake light.

The brake light signal output unit 1030 may output turning-on/off signals of a brake light to the primary abnormality signal output unit 1070 and the secondary abnormality signal output unit 1080. Herein, the turning-on/off signals of a brake light, which are signals for turning on and off the brake light, may be used to determine whether the brake light has been operated.

The vehicle control information output unit 1040 may output control information about whether an ABS (Antilock Braking System), a TCS (traction control system), an ETCS (electronic traction control system), a BTCS (Brake Traction Control System), and/or DTC (Dynamic Traction Control) has been controlled to the primary abnormality signal output unit 1070 and the secondary abnormality signal output unit 1080.

When a brake pedal is operated and a vehicle is braked by a driver, the master cylinder pressure sensor 1050 may measure pressure of the master cylinder and output the pressure to the secondary abnormality signal output unit 1080. Herein, a pressure value may be calculated when a driver operates the brake pedal to brake the vehicle, and is used not only for generating pressure of the master cylinder, but for determining whether a primary malfunction has been generated in a brake light by being transmitted to the secondary abnormality signal output unit 1080.

The malfunction information of the master cylinder pressure sensor 1050 may be generated on the basis of the pressure value based on operation of the brake pedal and the pressure measured by the master cylinder pressure sensor 1050 and may be outputted to the secondary abnormality signal output unit 1080 to be used for determining whether a secondary malfunction has been generated in a brake light.

The engine control system 1060 may calculate the speed of a vehicle by accurately analyzing data from various sensors related to the engine and output the calculated speed of the vehicle to the secondary abnormality signal output unit 1080.

The engine control system 1060 may detect a malfunction of a brake light by itself and output an abnormality signal for the brake light to the abnormality signal verifier 1090.

The primary abnormality signal output unit 1070 may determine whether a brake light is in a primary abnormal state using primary state information, and when the brake light is in the primary abnormal state, the primary abnormality signal output unit 1070 may output a primary abnormality signal to the abnormality signal verifier 1090. Herein, the primary state information may include the turning-on/off signals of a brake light, the speed of a vehicle measured by the speed sensor 1010, malfunction information of the brake pressure sensor 1020, pressure in a wheel of a vehicle, and/or control information of a vehicle, which were described above.

When a brake light has a malfunction, the speed of a vehicle is a reference speed or more, the brake pressure sensor 1020 has a malfunction, the pressure of a wheel of the vehicle is reference pressure or less, and/or the brake control systems of a vehicle (ABS, TCS, ETCS, BTCS, and/or DTC) are not controlled, the primary abnormality signal output unit 1070 may determine that the brake light is in a primary abnormal state. Herein, the reference speed, for example, may be 20 kph (kilometer per hour) and the reference pressure may be 7 bar.

When the brake light is in the primary abnormal state, the primary abnormality signal output unit 1070 may determine whether to output a primary abnormality signal using a continuing time of a turning-on or turning-off signal and a predetermined longest error-sensing time. Herein, the longest error-sensing time, for example, may be 120 seconds.

When the continuing time of a turning-on or turning-off signal is the predetermined longest error-sensing time or more, the primary abnormality signal output unit 1070 may output the primary abnormality signal to the abnormality signal verifier 1090. Herein, when the switch of a brake light is short-circuited, the turning-on/off signals remain outputted as when the pedal has been pressed, so the continuing time is used to determine whether to output the primary abnormality signal.

The secondary abnormality signal output unit 1080 may determine whether a brake light is in a secondary abnormal state using the secondary state information of the vehicle, and when the brake light is in the secondary abnormal state, the secondary abnormality signal output unit 1080 may output a secondary abnormality signal to the abnormality signal verifier 1090. Herein, the secondary state information may include the turning-on/off signals of a brake light, the speed of a vehicle calculated by the engine control system 1060, malfunction information of the master cylinder pressure sensor 1050, the pressure of the master cylinder, and/or control information of a vehicle, which were described above.

When a brake light has a malfunction, the speed of a vehicle is a reference speed or more, the master cylinder pressure sensor 1050 has a malfunction, the pressure of the master cylinder is reference pressure or less, and/or the brake control systems of a vehicle (ABS, TCS, ETCS, BTCS, and/or DTC) are not controlled, the secondary abnormality signal output unit 1080 may determine that the brake light is in a secondary abnormal state. Herein, the reference speed, for example, may be 20 kph (kilometer per hour) and the reference pressure may be 7 bar.

When the brake light is in the secondary abnormal state, the secondary abnormality signal output unit 1080 may determine whether to output a secondary abnormality signal using a continuing time of a turning-on or turning-off signal and a predetermined longest error-sensing time. Herein, the longest error-sensing time, for example, may be 120 seconds.

When the continuing time of a turning-on or turning-off signal is the predetermined longest error-sensing time or more, the secondary abnormality signal output unit 1080 may output the secondary abnormality signal to the abnormality signal verifier 1090. Herein, when the switch of a brake light is short-circuited, the turning-on/off signals remain outputted as when the pedal has been pressed, so the continuing time is used to determine whether to output the secondary abnormality signal.

When receiving the primary abnormality signal and the secondary abnormality signal, the abnormality signal verifier 1090 may output a third abnormality signal of the brake light. The abnormality signal verifier 1090 may output a fourth abnormality signal of the brake light using the third abnormality signal and an abnormality signal of a brake light outputted from the engine control system 1060. That is, when receiving both the third abnormality signal and the abnormality signal of a brake light outputted from the engine control system 1060, the abnormality signal verifier 1090 may output a fourth abnormality signal to the final abnormality determiner 1100.

When receiving the fourth abnormality signal, the final abnormality determiner 1100 may be changed into a malfunction state mode from a normal state mode, and may determine whether the brake light is in a final abnormal state, depending on whether a malfunction state mode-operating time exceeds a predetermined longest malfunction-sensing time. Herein, the longest malfunction-sensing time, for example, may be 120 seconds.

When the malfunction state mode-operating time exceeds the longest malfunction-sensing time, the final abnormality determiner 1100 may determine that the brake light is in the final abnormal state.

When determining that the brake light is in the final abnormal state, the final abnormality determiner 1100 may store an error code in the error code storage 1110. Further, when determining that the brake light is in the final abnormal state, the final abnormality determiner 1100 may output a malfunction signal for the brake light to the malfunction alarm 1120.

The malfunction alarm 1120 may warn a driver of a malfunction of a brake light using at least any one of a sound, an image, and a vibration.

Therefore, the apparatus for diagnosing a brake light according to the second exemplary embodiment may determine whether a brake light is abnormal using various pieces of information of the vehicle and can improve reliability when determining abnormality of a brake light.

Further, the apparatus for diagnosing a brake light according to the second exemplary embodiment can greatly reduce the possibility of errors such as misjudgment of a user's intention to brake for activation of ESC.

Figure 4:
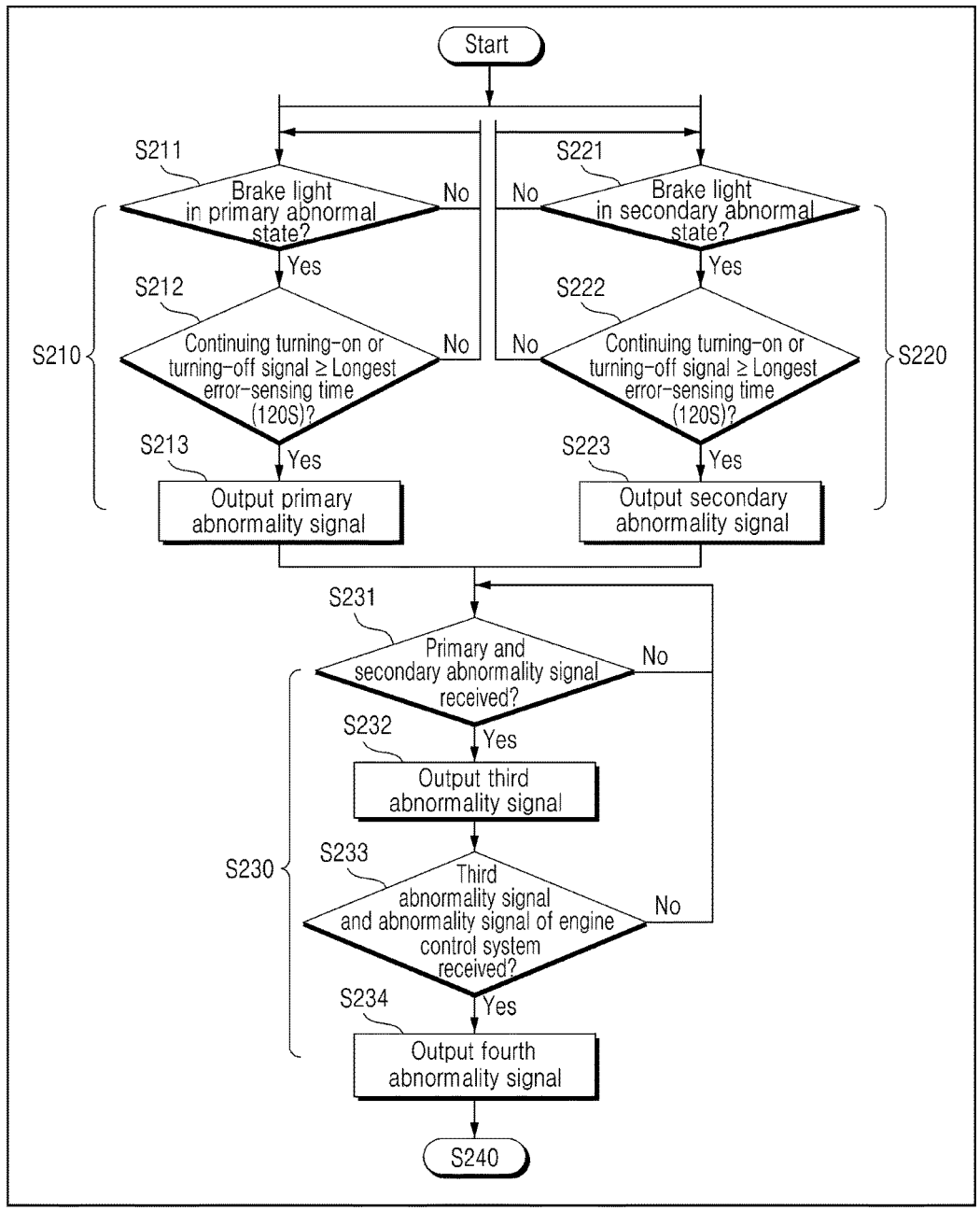
FIG. 4 is a first flowchart illustrating a control flow of a method of diagnosing a brake light by the configuration illustrated in FIG. 3.
Figure 5:
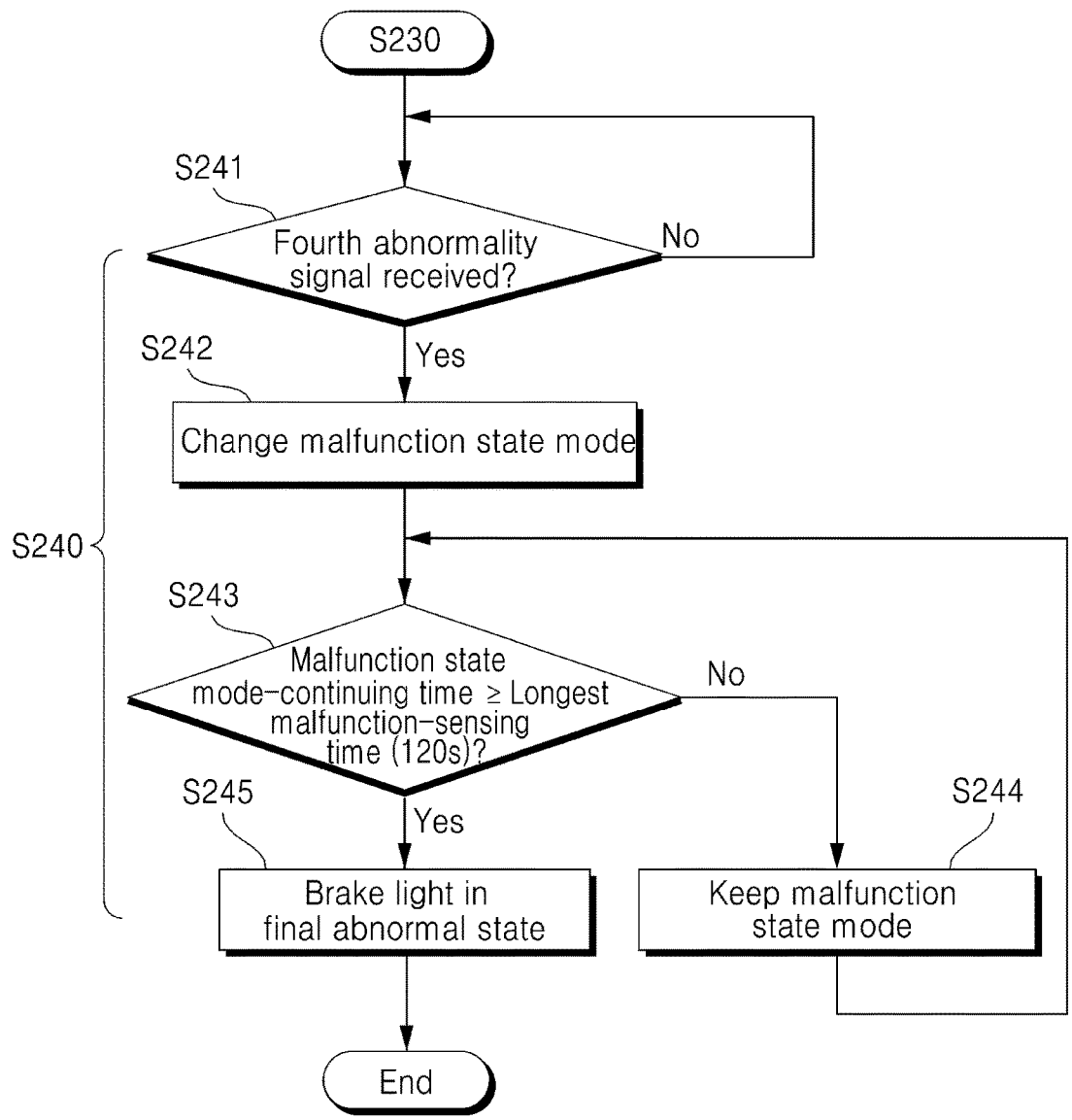
FIG. 5 is a second flowchart illustrating a control flow of a method of diagnosing a brake light by the configuration illustrated in FIG. 3.

Referring to FIG. 3, FIG. 4, and FIG. 5, a method of diagnosing a brake light according to another exemplary embodiment may include a primary abnormality signal output step (S210), a secondary abnormality signal output step (S220), a fourth abnormality signal output step (S230), and a final abnormality determining step (S240).

In the primary abnormality signal output step (S210), the primary abnormality signal output unit 1070 may determine whether a brake light is in the primary abnormal state using the primary state information of a vehicle (S211). Herein, the primary state information may include turning-on/off signals of a brake light, the speed of a vehicle, malfunction information of the brake pressure sensor, the pressure of a wheel of the vehicle, and/or the control information of the vehicle.

When the brake light has a malfunction, the speed of the vehicle is a reference speed or more, the brake pressure sensor 1020 has a malfunction, the pressure of a wheel of the vehicle is reference pressure or less, and/or the brake control system of the vehicle is not controlled, the primary abnormality signal output unit 1070 may determines that the brake light is in the primary abnormal state and compares the continuing time of the turning-on signal or the turning-off signal with a predetermined longest error-sensing time (for example, 120 seconds) (S212).

When the continuing time of the turning-on signal or the turning-off signal exceeds the predetermined longest error-sensing time, the primary abnormality signal output unit 1070 may output a primary abnormality signal (S213).

Meanwhile, in the secondary abnormality signal output step (S220), the secondary abnormality signal output unit 1080 may determine whether a brake light is in the secondary abnormal state using the secondary state information of a vehicle (S211). Herein, the secondary state information may include turning-on/off signals of a brake light, the speed of a vehicle calculated by the engine control system 1060, malfunction information of the master cylinder of the vehicle, the pressure of the master cylinder of the vehicle, and/or the control information of the vehicle.

When the brake light has a malfunction, the speed of the vehicle calculated by the engine control system 1060 is a reference speed or more, the master cylinder pressure sensor 1050 has a malfunction, the pressure of the master cylinder is reference pressure or less, and/or the brake control system of the vehicle is not controlled, the secondary abnormality signal output unit 1080 may determine that the brake light is in the secondary abnormal state and may compare the continuing time of the turning-on signal or the turning-off signal with a predetermined longest error-sensing time (for example, 120 seconds) (S222).

When the continuing time of the turning-on signal or the turning-off signal exceeds the predetermined longest error-sensing time, the secondary abnormality signal output unit 1080 may output a secondary abnormality signal (S223).

In the fourth abnormality signal output step (S230), the abnormality signal verifier 1090 may output a third abnormality signal of a brake light (S232), when receiving the primary abnormality signal or the secondary abnormality signal (S231).

When receiving the third abnormality signal and the abnormality signal of a brake light detected by the engine control system 1060 of the vehicle (S233), the abnormality signal verifier 1090 may output a fourth abnormality signal of a brake light (S234).

In the final abnormality determining step (S240), the final abnormality determiner 1100 is changed into a malfunction state mode (S242), when receiving the fourth abnormality signal (S241).

The final abnormality determiner 1100 may compare a malfunction state mode-continuing time with a longest malfunction-sensing time (for example, 120 seconds) (S243).

The final abnormality determiner 1100 may keep operating in the malfunction state mode when the malfunction state mode-continuing time is a longest malfunction-sensing time or less (S244).

The final abnormality determiner 1100 may determine that the brake light is in a final abnormal state when the malfunction state mode-continuing time exceeds the longest malfunction-sensing time (S245).

Thereafter, the final abnormality determiner 1100 may keep a malfunction code for the abnormal state of the brake light or warn the driver of the abnormal state.

The present disclosure and/or one or more components thereof, may be implemented via one or more general purpose and/or special purpose components, such as one or more discrete circuits, digital signal processing chips, integrated circuits, application specific integrated circuits, microprocessors, processors, programmable arrays, field programmable arrays, instruction set processors, and/or the like. In this manner, the features, functions, processes, etc., described herein may be implemented via software, hardware (e.g., general processor, digital signal processing (DSP) chip, an application specific integrated circuit (ASIC), field programmable gate arrays (FPGAs), etc.), firmware, or a combination thereof. As such, the present disclosure and/or one or more components thereof may include or otherwise be associated with one or more memories (not shown) including code (e.g., instructions) configured to cause the present disclosure and/or one or more components thereof to perform one or more of the features, functions, processes, etc., described herein.

The memories may be any medium that participates in providing code to the one or more software, hardware, and/or firmware components for execution. Such memories may be implemented in any suitable form, including, but not limited to, non-volatile media, volatile media, and transmission media. Non-volatile media include, for example, optical or magnetic disks. Volatile media include dynamic memory. Transmission media include coaxial cables, copper wire and fiber optics. Transmission media can also take the form of acoustic, optical, or electromagnetic waves. Common forms of computer-readable media include, for example, a floppy disk, a flexible disk, hard disk, magnetic tape, any other magnetic medium, a compact disk-read only memory (CD-ROM), a rewriteable compact disk (CDRW), a digital video disk (DVD), a rewriteable DVD (DVD-RW), any other optical medium, punch cards, paper tape, optical mark sheets, any other physical medium with patterns of holes or other optically recognizable indicia, a random-access memory (RAM), a programmable read only memory (PROM), and erasable programmable read only memory (EPROM), a FLASH-EPROM, any other memory chip or cartridge, a carrier wave, or any other medium from which information may be read by, for example, a controller/processor.

Therefore, according to exemplary embodiments of the apparatus and method for diagnosing a brake light, it is possible to determine whether a brake light is abnormal using various pieces of information from the vehicle and improve reliability when determining abnormality of a brake light.

Further, it is possible to greatly reduce the possibility of errors, such as misjudgment of user's intention to brake for ESC.

Although certain exemplary embodiments and implementations have been described herein, other embodiments and modifications will be apparent from this description. Accordingly, the inventive concept is not limited to such embodiments, but rather to the broader scope of the presented claims and various obvious modifications and equivalent arrangements.

What is claimed is:

1. An apparatus for diagnosing a brake light, comprising:
   a primary abnormality signal output unit configured to output a primary abnormality signal of the brake light using primary state information of a vehicle;
   a secondary abnormality signal output unit configured to output a secondary abnormality signal of the brake light using secondary state information of the vehicle;
   an abnormality signal verifier configured to output a third abnormality signal of the brake light when receiving the primary abnormality signal and the secondary abnormality signal, and configured to output a fourth abnormality signal of the brake light using the third abnormality signal and an abnormality signal from an engine control system of the vehicle; and
   a final abnormality determiner that is configured to change into a malfunction state mode from a normal state mode when receiving the fourth abnormality signal, and configured to determine whether the brake light is in a final abnormal state, depending on whether an operation time of the malfunction state mode exceeds a predetermined longest malfunction-sensing time.

2. The apparatus of claim 1, wherein the primary state information comprises turning-on/off signals of the brake light, a speed of the vehicle, malfunction information of a brake pressure sensor of the vehicle, pressure of a wheel of the vehicle, and control information of the vehicle.

3. The apparatus of claim 2, wherein when the brake light has a malfunction, the speed of the vehicle is a reference speed or more, the brake pressure sensor has a malfunction, the pressure of the wheel of the vehicle is reference pressure or less, and a brake control system of the vehicle is not controlled, the primary abnormality signal output unit is configured to determine that the brake light is in a primary abnormal state.

4. The apparatus of claim 3, wherein when the brake light is in the primary abnormal state, the primary abnormality signal output unit is configured to determine whether to output the primary abnormality signal using a continuing time of the turning-on or the turning-off signal and a predetermined longest error-sensing time.

5. The apparatus of claim 1, wherein the secondary state information comprises turning-on/off signals of the brake light, a speed of the vehicle calculated by the engine control system, malfunction information of a master cylinder of the vehicle, pressure of the master cylinder of the vehicle, and control information of the vehicle.

6. The apparatus of claim 5, wherein when the brake light has a malfunction, the speed of the vehicle is a reference speed or more, the master cylinder has a malfunction, the pressure of the master cylinder is reference pressure or less, and another control system of the vehicle is not controlled, the secondary abnormality signal output unit is configured to determine that the vehicle is in a secondary abnormal state.

7. The apparatus of claim 6, wherein when the vehicle is in the secondary abnormal state, the secondary abnormality signal output unit is configured to determine whether to output the secondary abnormality signal using a continuing time of the turning-on or the turning-off signal and a predetermined longest error-sensing time.

8. The apparatus of claim 1, wherein the final abnormality determiner is configured to determine that the brake light is in a final abnormal state and keeps an error code, when the operation time of the malfunction state mode exceeds the longest malfunction-sensing time.

9. A method of diagnosing a brake light, comprising:
   a primary abnormality signal output step in which a primary abnormality signal output unit outputs a primary abnormality signal of the brake light using primary state information of a vehicle;
   a secondary abnormality signal output step in which a secondary abnormality signal output unit outputs a secondary abnormality signal of the brake light using secondary state information of the vehicle;
   a third abnormality signal output step in which an abnormality signal verifier outputs a third abnormality signal of the brake light when receiving the primary abnormality signal and the secondary abnormality signal;
   a fourth abnormality signal output step in which the abnormality signal verifier outputs a fourth abnormality signal of the brake light using the third abnormality signal and an abnormality signal from an engine control system of the vehicle; and
   a final abnormality determining step in which a final abnormality determiner is changed into a malfunction state mode from a normal state mode when receiving the fourth abnormality signal and determines whether the brake light is in a final abnormal state, depending on whether an operation time of the malfunction state mode exceeds a predetermined longest malfunction-sensing time.

10. The method of claim 9, wherein the primary state information comprises
    turning-on/off signals of the brake light, a speed of the vehicle, malfunction information of a brake pressure sensor of the vehicle, pressure of a wheel of the vehicle, and control information of the vehicle.

11. The method of claim 10, wherein the primary abnormality signal output step comprises
    a primary state determining step of determining that the brake light is in a primary state, depending on whether the brake light has a malfunction, the speed of the vehicle is a reference speed or more, the brake pressure sensor has a malfunction, the pressure of the wheel of the vehicle is reference pressure or less, and a brake control system of the vehicle is not controlled.

12. The method of claim 11, wherein when the brake light is in the primary abnormal state, the primary abnormality signal output step determines whether to output the primary abnormality signal using a continuing time of the turning-on or the turning-off signal and a predetermined longest error-sensing time.

13. The method of claim 9, wherein the secondary state information comprises turning-on/off signals of the brake light, a speed of the vehicle calculated by the engine control system, malfunction information of a master cylinder of the vehicle, pressure of the master cylinder of the vehicle, and control information of the vehicle.

14. The method of claim 13, wherein the secondary abnormality signal output step comprises
- a secondary state determining step of determining that the brake light is in a secondary state, depending on whether the brake light has a malfunction, a speed of the vehicle calculated by the engine control system is a reference speed or more, the master cylinder has a malfunction, the pressure of the master cylinder is reference pressure or less, and a brake control system of the vehicle is not controlled.

15. The method of claim 14, wherein when the brake light is in the secondary abnormal state, the secondary abnormality signal output step determines whether to output the secondary abnormality signal using a continuing time of the turning-on or the turning-off signal and a predetermined longest error-sensing time.

\* \* \* \* \*